(12) United States Patent
Yin

(10) Patent No.: US 11,221,529 B2
(45) Date of Patent: Jan. 11, 2022

(54) MANUFACTURING METHOD FOR A NARROW BORDER DISPLAY SCREEN AND DISPLAY DEVICE

(71) Applicant: WUHAN CHINA STAR OPTOELECTRONICS TECHNOLOGY CO., LTD., Hubei (CN)

(72) Inventor: Bingkun Yin, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 319 days.

(21) Appl. No.: 16/483,539

(22) PCT Filed: Apr. 9, 2019

(86) PCT No.: PCT/CN2019/081932
§ 371 (c)(1),
(2) Date: Aug. 5, 2019

(87) PCT Pub. No.: WO2020/133794
PCT Pub. Date: Jul. 2, 2020

(65) Prior Publication Data
US 2021/0333665 A1 Oct. 28, 2021

(30) Foreign Application Priority Data
Dec. 29, 2018 (CN) .......................... 201811647087.6

(51) Int. Cl.
*G02F 1/1362* (2006.01)
*G02F 1/1368* (2006.01)
*G02F 1/1333* (2006.01)

(52) U.S. Cl.
CPC ...... *G02F 1/136222* (2021.01); *G02F 1/1368* (2013.01); *G02F 1/133305* (2013.01)

(58) Field of Classification Search
None
See application file for complete search history.

(56) References Cited

U.S. PATENT DOCUMENTS

| 2015/0359106 | A1 | 12/2015 | Kim et al. |
| 2016/0019019 | A1* | 1/2016 | Ikeda .................. G06F 3/0412 345/173 |
| 2016/0247981 | A1 | 8/2016 | Yang et al. |
| 2019/0123149 | A1* | 4/2019 | Lee .................... H01L 29/7786 |
| 2020/0064680 | A1 | 2/2020 | Chien |

FOREIGN PATENT DOCUMENTS

| CN | 104885576 A | 9/2015 |
| CN | 105223747 A | 1/2016 |
| CN | 106502004 A | 3/2017 |
| CN | 107728348 A | 2/2018 |

\* cited by examiner

*Primary Examiner* — Richard H Kim

(57) ABSTRACT

The present disclosure replace the unbendable glass substrate of the non-display portion of the first glass substrate connected to the integrated circuit chip with a bendable flexible substrate, and bend the bending portion of the flexible substrate and the integrated circuit chip connected therewith to the side or the back of the glass substrate, thereby reduce the area of the non-display portion and significantly increase the screen-to-body ratio of the display portion.

13 Claims, 4 Drawing Sheets

MANUFACTURING METHOD FOR A NARROW BORDER DISPLAY SCREEN AND DISPLAY DEVICE

FIELD OF INVENTION

The present disclosure relates to the technical field of liquid crystal display, and especially to a manufacturing method for a narrow border display screen and a display device.

BACKGROUND OF INVENTION

With the global rising of information society, there is increased need for various display devices. Therefore, great effort has been invested in research and development of various flat panel display devices such as liquid crystal displays (LCDs), plasma display panels (PDPs), electro luminescence displays (ELDs) and vacuum fluorescent displays (VFDs).

While display devices have become popular, not only the features and performance of display devices, but also the appearance of display devices that the users require have become more and more strict. The requirements of display devices to be light and thin and having narrow borders become more and more important a consideration when choosing display devices.

However, in a conventional display device, because various driving modules and circuit boards need to be bonded and connected to the display panel, enough space of non-display area has to be preserved on the display panel for wire bonding, which leads to a generally larger non-display area of display panels that is adverse to a narrow border design of display devices.

In short, the conventional display devices have problems like a wider border of non-display area and a lower screen-to-body ratio. Therefore, it is necessary to provide a manufacturing method for a narrow border display screen and a display device to improve this drawback.

SUMMARY OF INVENTION

In a conventional display device, because various driving modules and circuit boards need to be bonded and connected to the display panel, an enough space of non-display area has to be preserved on the display panel for wire bonding, which leads to a generally larger non-display area of display panels that is adverse to a narrow border design of display devices.

The present disclosure provides a manufacturing method for a narrow border display screen and a display device to overcome the problem of wider borders and lower screen-to-body ratios of the conventional display devices.

The present disclosure provides a manufacturing method for a narrow border display screen, and the method includes step S10: providing a first glass substrate, wherein the first glass substrate includes a display portion and a non-display portion, and coating a flexible base material on the non-display portion; step S20: heating and baking the flexible base material to form a flexible substrate, wherein the flexible substrate includes a bending portion and a non-bending portion; step S30: cutting off a part of the non-display portion affixed to the bending portion therefrom; and step S40: bending the bending portion to a side or a back of the first glass substrate.

According to an embodiment of the present disclosure, the flexible base material is shaped into strips and arranged as an array on the first glass substrate.

According to an embodiment of the present disclosure, the flexible base material is polyimide.

According to an embodiment of the present disclosure, step S30 further includes step S301: forming a thin film transistor layer and a first alignment layer in order on the first glass substrate, wherein the first glass substrate together with the thin film transistor layer and the first alignment layer integrate into an array substrate; step S302: forming a color filter layer and a second alignment layer in order on a second glass substrate, wherein the second glass substrate together with the color filter layer and the second alignment layer integrate into a color film substrate; step S303: performing a sealant dispense process, a liquid crystal dropping process and a vacuum lamination process to the array substrate and the color film substrate to form liquid crystal cells; step S304: putting the liquid crystal cells through cutting, polarizer attachment and integrate circuit chip lamination processes to form numerous liquid crystal panels; and step S305: cutting off a part of the first glass substrate affixed to the bending portion therefrom.

According to an embodiment of the present disclosure, the thin film transistor layer includes a buffer layer, a gate layer, a silicon island layer, a source and drain layer, a passivation protective layer and a pixel electrode layer.

The present disclosure provides a display device, and the display device includes an array substrate and a color film substrate disposed facing the array substrate, wherein the array substrate includes a first glass substrate including a display portion and a non-display portion; a flexible substrate including a bending portion and a non-bending portion, wherein the bending portion is bent to a side or a back of the first glass substrate, and the non-bending portion is disposed on the non-display portion; a thin film transistor layer disposed on the first glass substrate and the flexible substrate; and an integrated circuit chip disposed on the thin film transistor layer at an end closer to the bending portion.

According to an embodiment of the present disclosure, the flexible base material is yellow polyimide.

According to an embodiment of the present disclosure, the array substrate further includes a first buffer layer, and the first buffer layer is disposed between the first glass substrate and the thin film transistor layer.

According to an embodiment of the present disclosure, the color film substrate includes a second buffer layer, and the second buffer layer is disposed between the color filter layer and the second glass substrate.

According to an embodiment of the present disclosure, the display device further includes a backlight module, and the backlight module is disposed on a side of the array substrate distant to the color film substrate.

The present disclosure provides a manufacturing method for a narrow border display screen, and the method includes step S10: providing a first glass substrate, wherein the first glass substrate includes a display portion and a non-display portion, and coating a flexible base material on the non-display portion; step S20: heating and baking the flexible base material to form a flexible substrate, wherein the flexible substrate includes a bending portion and a non-bending portion; step S30: cutting off a part of the non-display portion affixed to the bending portion therefrom; and step S40: bending the bending portion to a side or a back of the first glass substrate; wherein the flexible base material is shaped into strips and is polyimide.

According to an embodiment of the present disclosure, step S30 further includes step S301: forming a thin film transistor layer and a first alignment layer in order on the first glass substrate, wherein the first glass substrate together with the thin film transistor layer and the first alignment layer integrate into an array substrate; step S302: forming a color filter layer and a second alignment layer in order on a second glass substrate, wherein the second glass substrate together with the color filter layer and the second alignment layer integrate into a color film substrate; step S303: performing a sealant dispense process, a liquid crystal dropping process and a vacuum lamination process to the array substrate and the color film substrate to form liquid crystal cells; step S304: putting the liquid crystal cells through cutting, polarizer attachment and integrate circuit chip lamination processes to form numerous liquid crystal panels; and step S305: cutting off a part of the first glass substrate affixed to the bending portion therefrom.

According to an embodiment of the present disclosure, the thin film transistor layer includes a buffer layer, a gate layer, a silicon island layer, a source and drain layer, a passivation protective layer and a pixel electrode layer.

The embodiments of the present disclosure replace the unbendable glass substrate of the non-display portion of the first glass substrate connected to the integrated circuit chip with a bendable flexible substrate, and use the bending property of the flexible substrate to bend the bending portion of the flexible substrate and the integrated circuit chip connected therewith to the side or the back of the glass substrate, thereby reduce the area of the non-display portion and significantly increase the screen-to-body ratio of the display screen and of the display portion of the display device.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

DETAILED DESCRIPTION OF PREFERRED EMBODIMENTS

Figure 1:
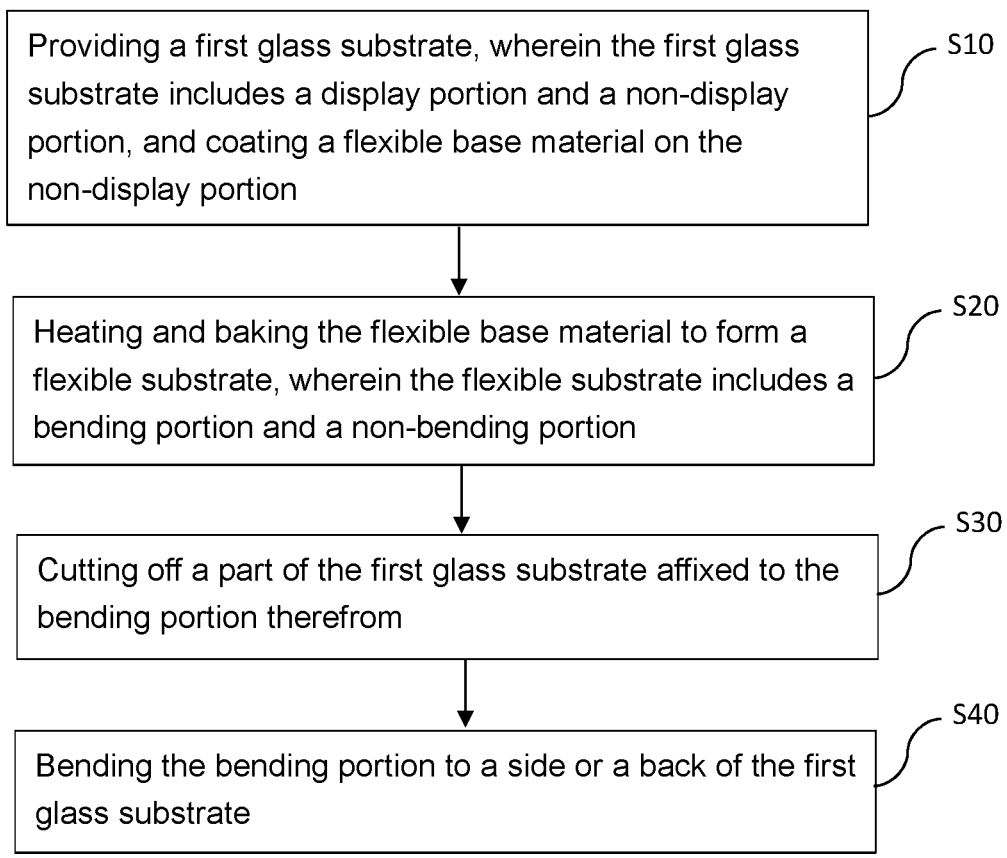
FIG. 1 is a flowchart of the manufacturing method according to an embodiment of the present disclosure.
Figure 2:
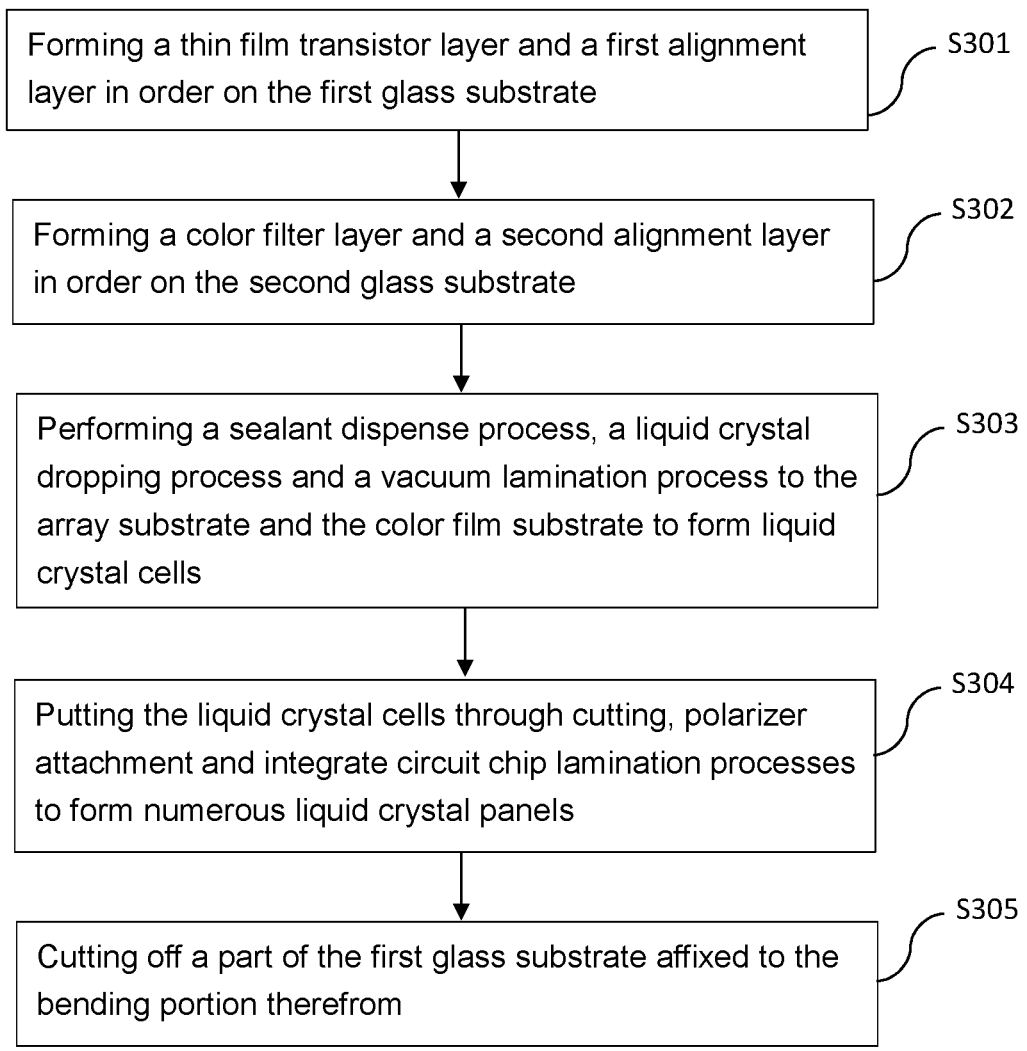
FIG. 2 is a flowchart of the manufacturing method according to an embodiment of the present disclosure.

The embodiments of the present disclosure are described in detail hereinafter. Examples of the described embodiments are given in the accompanying drawings. In the description of the present disclosure, it should be understood that terms such as "upper," "lower," "front," "rear," "left," "right," "inside," "outside," as well as derivative thereof should be construed to refer to the orientation as shown in the drawings under discussion. These relative terms are for convenience of description and shall not be construed as causing limitations to the present disclosure. The identical reference numerals constantly denote the similar elements.

The present disclosure will now be described more fully hereinafter with reference to the accompanying drawings, in which exemplary embodiments of the invention are shown.

First Embodiment

The present disclosure provides a manufacturing method for a narrow border display screen as described in detail hereinafter with reference to FIG. 1 to FIG. 5.

Figure 4:
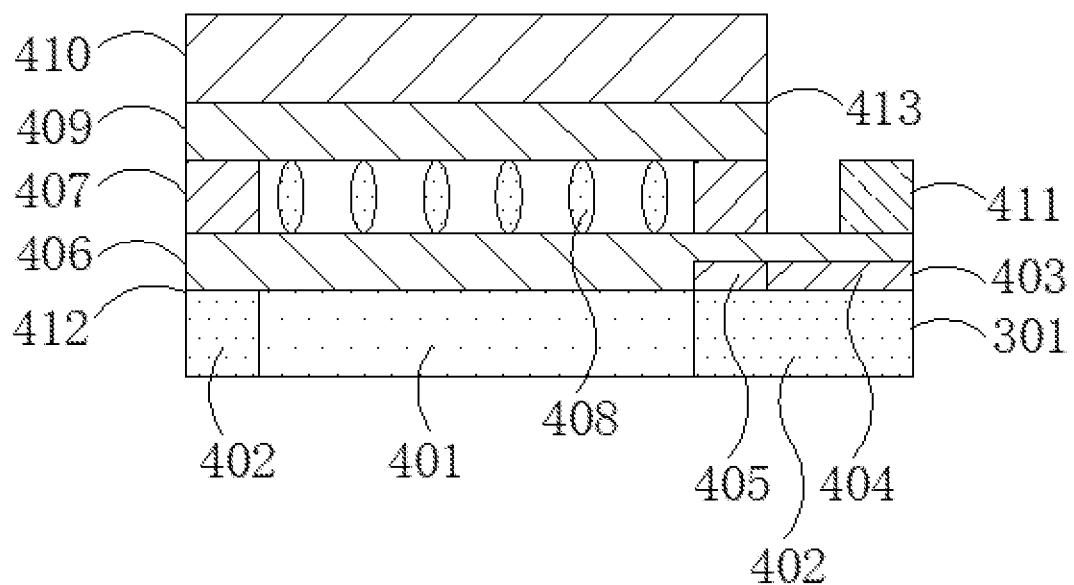
FIG. 4 is a schematic view of the structure of the display device according to an embodiment of the present disclosure.
Figure 5:
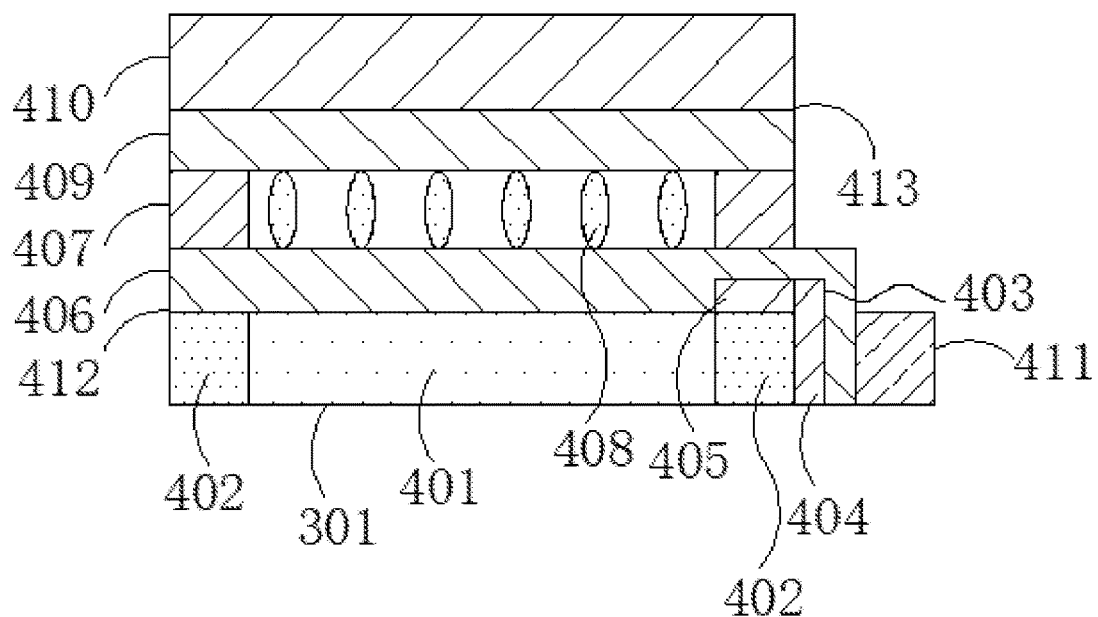
FIG. 5 is a schematic view of the structure of the display device according to an embodiment of the present disclosure.

FIG. 1 is a flowchart of the manufacturing method according to an embodiment of the present disclosure. The method includes step S10: as shown in FIG. 4, providing a first glass substrate 301, wherein the first glass substrate 301 includes a display portion 401 and a non-display portion 402 disposed on two sides of the display portion 401, and coating a flexible base material 302 on the non-display portion 402; step S20: heating and baking the flexible base material 302 to form a flexible substrate 403, wherein the flexible substrate 403 includes a bending portion 404 and a non-bending portion 405; step S30: as shown in FIG. 5, cutting off a part of the non-display portion 402 affixed to the bending portion 404 therefrom; step S40: bending the bending portion 404 to a side or a back of the first glass substrate 301.

Figure 3:
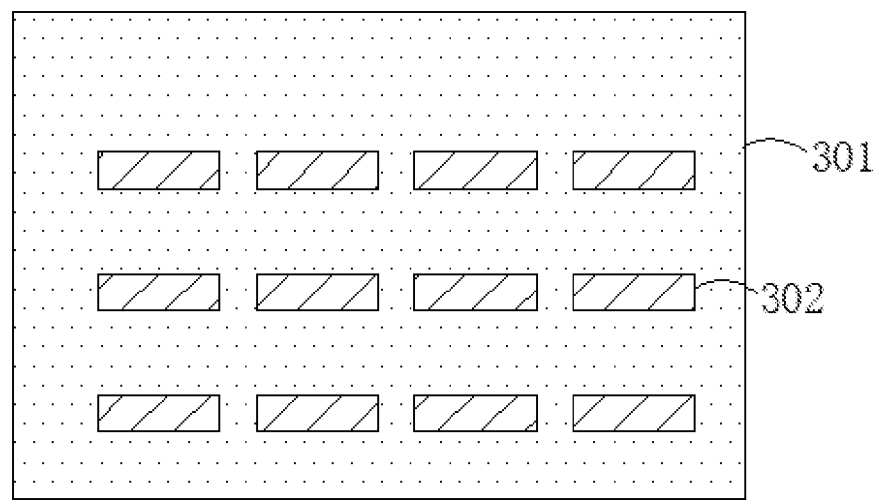
FIG. 3 is a schematic view of the flexible base material arranged on the first glass substrate according to an embodiment of the present disclosure.

In this embodiment, step S30 further includes step S301: forming a thin film transistor layer 406 and a first alignment layer (not shown) in order on the first glass substrate 301, wherein the first glass substrate 301 together with the thin film transistor layer 406 and the first alignment layer integrate into an array substrate 412; step S302: forming a color filter layer 409 and a second alignment layer (not shown) in order on a second glass substrate 410, wherein the second glass substrate 410 together with the color filter layer 409 and the second alignment layer integrate into a color film substrate 413; step S303: performing a sealant dispense process, a liquid crystal dropping process and a vacuum lamination process in order to the array substrate 412 and the color film substrate 413 to form liquid crystal cells, wherein the liquid crystal layer 408 is located between the array substrate 412 and the color film substrate 413, and the sealant 407 is located on two sides of the liquid crystal layer 408; step S304: putting the liquid crystal cells through cutting, polarizer attachment and integrate circuit chip lamination processes to form numerous liquid crystal panels; step S305: cutting off a part of the non-display portion 402 affixed to the bending portion 404 therefrom;

Advantageously, as shown in FIG. 3, the flexible base material 302 is shaped into strips and arranged as an array on the first glass substrate 301.

Advantageously, the flexible base material 302 is polyimide, and for the sake of better mechanical properties and heat resistance, yellow polyimide or other heat-resistant polymer materials can also be chosen.

Advantageously, the thin film transistor layer includes a buffer layer, a gate layer, a silicon island layer, a source and drain layer, a passivation protective layer and a pixel electrode layer (above all not shown).

Second Embodiment

The present embodiment provides a display device, as shown in FIG. 5, including an array substrate 412 and a color film substrate 413 disposed facing the array substrate 412, wherein the array substrate 412 includes: a first glass substrate 301 including a display portion 401 and a non-display portion 402 disposed on two sides of the display portion 401; a flexible substrate 403 including a bending portion 404 and a non-bending portion 405, wherein the bending portion 404 is bent to a side of the first glass substrate 301, and the non-bending portion 405 is disposed on the non-display portion 402 of the first glass substrate 301; a thin film transistor layer 406 disposed on the first glass substrate 301 and the flexible substrate 403; and an integrated circuit chip 411 disposed on the thin film transistor layer 406 at an end closer to the bending portion 404.

In this embodiment, the thin film transistor layer 406 and the integrated circuit chip 411 on the bending portion 404 are bent to the side of the first glass substrate 301 along with the bending portion 404 of the flexible substrate 403.

Advantageously, the flexible substrate 403 is made of polyimide, and for the sake of better mechanical properties and heat resistance, yellow polyimide or other heat-resistant polymer materials can also be chosen.

Advantageously, the array substrate 412 further includes a first buffer layer (not shown), and the first buffer layer is disposed between the first glass substrate 301 and the thin film transistor layer 406.

Advantageously, the color film substrate 413 includes a second buffer layer (not shown), and the second buffer layer is disposed between the color filter layer 409 and the second glass substrate 410.

Advantageously, the display device further includes a backlight module (not shown), and the backlight module is disposed on a side of the array substrate 412 distant to the color film substrate 413.

Third Embodiment

Figure 6:
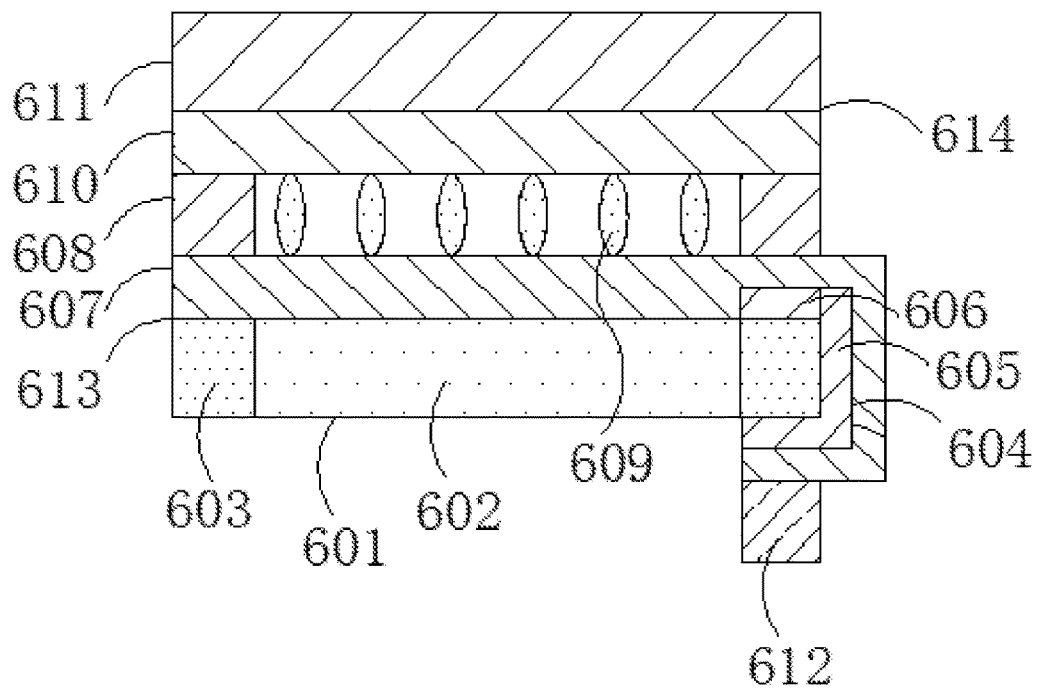
FIG. 6 is a schematic view of the structure of the display device according to an embodiment of the present disclosure.

The present embodiment provides a display device, as shown in FIG. 6, including an array substrate 613 and a color film substrate 614 disposed facing the array substrate 613, wherein the array substrate 613 includes: a first glass substrate 601 including a display portion 602 and a non-display portion 603 disposed on two sides of the display portion 602; a flexible substrate 604 including a bending portion 605 and a non-bending portion 606, wherein the bending portion 605 can be bent to a back of the first glass substrate 601 passing a side of the first glass substrate 601, and the non-bending portion 606 is disposed on the non-display portion 603 of the first glass substrate 601; a thin film transistor layer 607 disposed on the first glass substrate 601 and the flexible substrate 604; and an integrated circuit chip 612 disposed on the thin film transistor layer 607 at an end closer to the bending portion 605.

In this embodiment, the thin film transistor layer 607 on the bending portion 605 and the integrated circuit chip 612 disposed on the thin film transistor layer 607 are bent to the back of the first glass substrate 601 along with the bending portion 605 of the flexible substrate 604.

Advantageously, the flexible substrate 604 is made of polyimide, and for the sake of better mechanical properties and heat resistance, yellow polyimide or other heat-resistant polymer materials can also be chosen.

Advantageously, the array substrate 613 further includes a first buffer layer (not shown), and the first buffer layer is disposed between the first glass substrate 601 and the thin film transistor layer 607.

Advantageously, the color film substrate 614 includes a second buffer layer (not shown), and the second buffer layer is disposed between the color filter layer 610 and the second glass substrate 611.

Advantageously, the display device further includes a backlight module (not shown), and the backlight module is disposed on a side of the array substrate 613 distant to the color film substrate 614.

The embodiments of the present disclosure replace the unbendable glass substrate of the non-display portion of the first glass substrate connected to the integrated circuit chip with a bendable flexible substrate, and use the bending property of the flexible substrate to bend the bending portion of the flexible substrate and the integrated circuit chip connected therewith to the side or the back of the glass substrate, thereby reduce the area of the non-display portion and significantly increase the screen-to-body ratio of the display screen and of the display portion of the display device.

Although the present discloser has been explained in relation to its preferred embodiment, it does not intend to limit the present discloser. It will be apparent to those skilled in the art having regard to this present discloser that other modifications of the exemplary embodiments beyond those embodiments specifically described here may be made without departing from the spirit of the discloser. Accordingly, such modifications are considered within the scope of the discloser as limited solely by the appended claims.

What is claimed is:

1. A manufacturing method for a narrow border display screen comprising:
    step S10: providing a first glass substrate, wherein the first glass substrate comprises a display portion and a non-display portion, and coating a flexible base material on the non-display portion;
    step S20: heating and baking the flexible base material to form a flexible substrate, wherein the flexible substrate comprises a bending portion and a non-bending portion;
    step S30: forming a thin film transistor layer on the first glass substrate and the flexible substrate, forming an integrated circuit chip on the thin film transistor layer at an end closer to the bending portion, and cutting off a part of the non-display portion affixed to the bending portion therefrom; and
    step S40: bending the bending portion to a side or a back of the first glass substrate.

2. The manufacturing method as claimed in claim 1, wherein the flexible base material is shaped into strips and arranged as an array on the first glass substrate.

3. The manufacturing method as claimed in claim 2, wherein the flexible base material is polyimide.

4. The manufacturing method as claimed in claim 1, wherein step S30 further comprises:
    step S301: forming the thin film transistor layer and a first alignment layer in order on the first glass substrate, wherein the first glass substrate together with the thin film transistor layer and the first alignment layer integrate into an array substrate;
    step S302: forming a color filter layer and a second alignment layer in order on a second glass substrate, wherein the second glass substrate together with the color filter layer and the second alignment layer integrate into a color film substrate;
    step S303: performing a sealant dispense process, a liquid crystal dropping process and a vacuum lamination process to the array substrate and the color film substrate to form liquid crystal cells;

step S304: putting the liquid crystal cells through cutting, polarizer attachment and integrate circuit chip lamination processes to form numerous liquid crystal panels; and step S305: cutting off a part of the first glass substrate affixed to the bending portion therefrom.

5. The manufacturing method as claimed in claim 4, wherein the thin film transistor layer comprises a buffer layer, a gate layer, a silicon island layer, a source and drain layer, a passivation protective layer and a pixel electrode layer.

6. A display device comprising an array substrate and a color film substrate disposed facing the array substrate, wherein the array substrate comprises:
- a first glass substrate comprising a display portion and a non-display portion;
- a flexible substrate comprising a bending portion and a non-bending portion, wherein the bending portion is bent to a side or a back of the first glass substrate, and the non-bending portion is disposed on the non-display portion;
- a thin film transistor layer disposed on the first glass substrate and the flexible substrate; and
- an integrated circuit chip disposed on the thin film transistor layer at an end closer to the bending portion.

7. The display device as claimed in claim 6, wherein the flexible base material is yellow polyimide.

8. The display device as claimed in claim 6, wherein the array substrate further comprises a first buffer layer, and the first buffer layer is disposed between the first glass substrate and the thin film transistor layer.

9. The display device as claimed in claim 8, wherein the color film substrate comprises a second buffer layer, and the second buffer layer is disposed between the color filter layer and the second glass substrate.

10. The display device as claimed in claim 6, wherein the display device further comprises a backlight module, and the backlight module is disposed on a side of the array substrate distant to the color film substrate.

11. A manufacturing method for a narrow border display screen comprising:
- step S10: providing a first glass substrate, wherein the first glass substrate comprises a display portion and a non-display portion, and coating a flexible base material on the non-display portion;
- step S20: heating and baking the flexible base material to form a flexible substrate, wherein the flexible substrate comprises a bending portion and a non-bending portion;
- step S30: forming a thin film transistor layer on the first glass substrate and the flexible substrate, forming an integrated circuit chip on the thin film transistor layer at an end closer to the bending portion, and cutting off a part of the non-display portion affixed to the bending portion therefrom; and
- step S40: bending the bending portion to a side or a back of the first glass substrate;

wherein the flexible base material is shaped into strips and is polyimide.

12. The manufacturing method as claimed in claim 11, wherein step S30 further comprises:
- step S301: forming the thin film transistor layer and a first alignment layer in order on the first glass substrate, wherein the first glass substrate together with the thin film transistor layer and the first alignment layer integrate into an array substrate;
- step S302: forming a color filter layer and a second alignment layer in order on a second glass substrate, wherein the second glass substrate together with the color filter layer and the second alignment layer integrate into a color film substrate;
- step S303: performing a sealant dispense process, a liquid crystal dropping process and a vacuum lamination process to the array substrate and the color film substrate to form liquid crystal cells;
- step S304: putting the liquid crystal cells through cutting, polarizer attachment and integrate circuit chip lamination processes to form numerous liquid crystal panels; and
- step S305: cutting off a part of the first glass substrate affixed to the bending portion therefrom.

13. The manufacturing method as claimed in claim 12, wherein the thin film transistor layer comprises a buffer layer, a gate layer, a silicon island layer, a source and drain layer, a passivation protective layer and a pixel electrode layer.

* * * * *